(No Model.)
L. & J. C. COBURN.
MACHINE FOR CUTTING CORSETS, RAGS, &c.
No. 272,856. Patented Feb. 27, 1883.
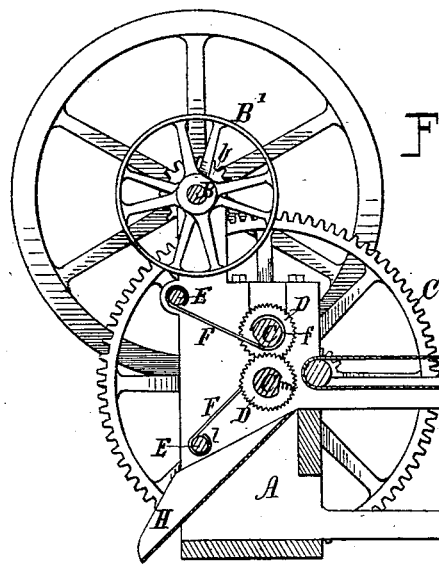
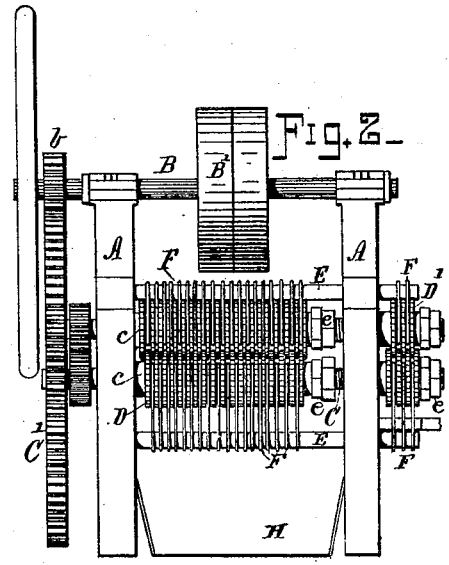
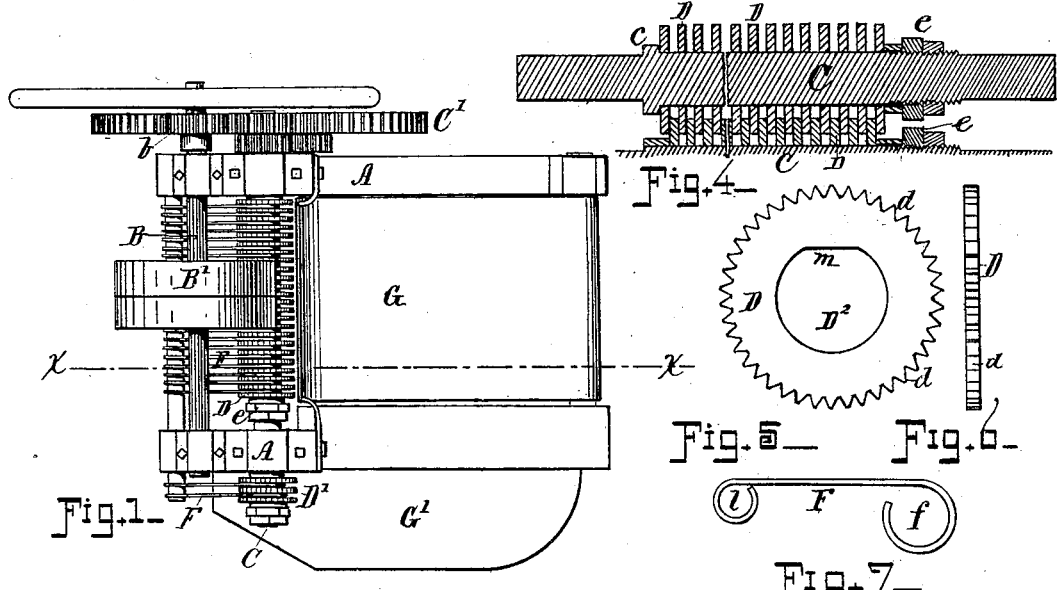
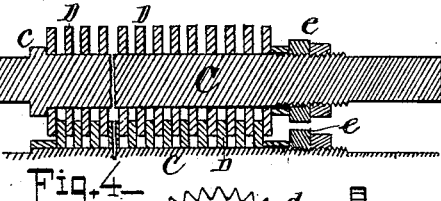
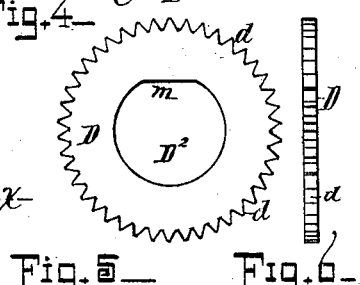
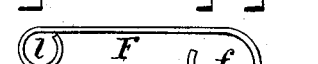
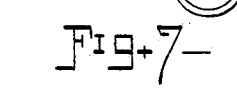
WITNESSES
A. W. Mathews
Geo. M. Rice 2d
INVENTORS
Lemuel Coburn
Jehiel C. Coburn
By Chas. H. Burleigh
Atty.

UNITED STATES PATENT OFFICE.

LEMUEL COBURN AND JEHIEL C. COBURN, OF WORCESTER, MASS.

MACHINE FOR CUTTING CORSETS, RAGS, &c.

SPECIFICATION forming part of Letters Patent No. 272,856, dated February 27, 1883.

Application filed July 18, 1882. (No model.)

*To all whom it may concern:*

Be it known that we, LEMUEL COBURN and JEHIEL C. COBURN, both of Worcester, in the county of Worcester and State of Massachusetts, have invented certain new and useful Improvements in Machines for Cutting Corsets, Rags, &c.; and we declare the following to be a description of our said invention sufficiently full, clear, and exact to enable others skilled in the art to which it appertains to make and use the same, reference being had to the accompanying drawings, which form a part of this specification.

The object of our present invention is to provide a practical and efficient mechanism for cutting or severing old corsets, paper stock, rags, &c., or materials having whalebones, steels, buttons, eyelets, or other hard substances incorporated in their structure, said mechanism being also adapted for cutting feed, ensilage, and other similar materials; also, to afford means for clearing the severed material from the cutters and facilities for adjusting the mechanism to accommodate wear or change of cutters.

For the attainment of these objects our invention consists in a cutting-machine provided with a series of notched disks or shearing-cutters mounted in peculiar manner upon rotating shafts, and arranged for interacting with each other in the manner as hereinafter explained; also, in the manner of supporting and adjusting said cutters, and in the combination of cutters and clearers, as more fully hereinafter explained, the particular subject-matter claimed being definitely specified.

In the drawings, Figure 1 is a plan view of a cutting-machine illustrating the nature of our invention. Fig. 2 is a vertical section of the same at line $x\ x$. Fig. 3 is a rear end view of the machine. Fig. 4 is a longitudinal sectional view, showing the arrangement of the cutters upon their rotating shafts. Fig. 5 is a side view of one of the cutter-disks on a larger scale. Fig. 6 is an edge view of the same, and Fig. 7 is a side view of one of the clearer-bars.

In referring to the drawings, A denotes the frame, of proper form and material, and provided with suitable bearings for supporting the operative parts.

B indicates the driving-shaft, mounted on the upper part of the frame, and provided with pulleys $B^2$, for the driving-belt.

C C indicate the cutter-shaft, on which are mounted the counters or shearing-disks D, of which the working-cylinders are composed. Said shafts are journaled in bearings on the frame A, one of them being provided with a gear, $C'$, that meshes with a pinion, $b$, on shaft B for operating the cylinders when shaft B is set in motion. Shafts C and C may be geared together; or one of said shafts may be left free to be revolved by the friction or interaction of the cutters D of the opposite cylinder. The cutter-disks D are made in the form shown in Figs. 5 and 6, with a central eye or opening, $D'$, to fit over the shaft C, and with a series of depressions, teeth, or serrations, $d$, about the periphery. Said disks may be made from plate-steel, or may be punched from sheet-iron and case-hardened after the teeth $d$ have been formed. The disks are preferably about one-fourth of an inch in thickness for ordinary work, although we do not desire to confine ourselves to any particular dimensions, as the size of the disks may be varied as required. The cutters or disks D are slipped onto the shafts C C, alternating with each other on the respective shafts, as indicated, the cutters on the upper shaft being separated at their edges by the cutters on the lower shaft, and vice versa. Said cutters are retained laterally by a collar or shoulder, $c$, fixed upon the shaft at one end of the cylinder, and by nuts $e$, screwed onto the shaft at the opposite end, as illustrated, so as to confine the cutters within a given limit of the length of the shaft C, the cutters or disks being free to adjust themselves within said limit to the space intermediate between the cutters of the other cylinder. Thus the edge of the cutters of the upper cylinder interact with and serve to keep separate the cutters of the lower cylinder, and vice versa, while all of the notched edges or peripheral angles of the several disks D on one cylinder or shaft C shear past or against the adjacent edges or angles of the disks on the opposite shaft or cylinder when the mechanism is rotated, thus effecting a series of stripping-cuts corresponding in width to the respective thickness of the disks or cutters. The eye D' of the cutters D and the shafts C are made of corresponding irregular shape, or with a flattened side, as at m, or provided with some equivalent means for retaining them in position and preventing any independent rotation between the shaft and cutter-disks. By turning the nuts e upon the shafts C the shearing-edges of the cutters can be set together with greater or less force, said cutters being laterally free among themselves. Adjustment at all the cutting-angles is effected simultaneously by the adjustment of nuts e.

F indicates clearer bars or fingers, which are arranged between the respective cutters D in series corresponding therewith. These clearer-bars are arranged to nearly fill the width of the spaces between the disks D. They extend from the shaft C to a position beyond the peripheral line or edges of the disks, their outer ends being retained stationary by suitable supports, E, so that any of the severed material that becomes wedged in or caught between the parallel sides of the adjacent disks will be forced outward from the spaces as the disks revolve past the clearer-bars. Thus the severed material is freed and discharged from among the cutters or prevented from winding around the cylinders. Said clearers F are made, as shown in Fig. 7, (preferably of round wire, although flat plates may be employed, if desired,) with a loop, f, at one end to fit over the shaft C, and the loop l at the opposite end, through which is passed a support-bar, E, that extends across the frame A, and by means of which the outer ends of the series of clearers are retained in a uniform line and the respective clearers prevented from turning out of place by the strain of the work and the revolving of the cutters.

G indicates the endless traveling apron for feeding the material to the cutters. Said apron may be mounted on guiding-rolls, and be operated in any suitable manner; or, if preferred, a stationary table may be used instead of the traveling apron. A stationary table is shown at G' in front of the stripping-cutters at D'.

H indicates a chute for collecting and directing the cut material as it falls from the cutter-cylinders. The machines may be made with long cutter-cylinders, as shown, between the frames A A, and with bearings at each end; or they may be made with short projecting cutter-cylinders, as at D', or with both the long and short cylinders, as shown in the drawings. Also, any desired number of disks or cutters D may be used to compose the cylinders, and said cutters may be formed of any thickness required. Cutters of different thicknesses can be run together when desired, and one series of cutters can be readily exchanged for another of different thickness by simply raising the shafts C from the bearings, removing the nuts e, and sliding off those which are on the shaft and then sliding on the other set of cutters. When it is desired to cut the material into strips or pieces of considerable width, tubular cylindrical blanks may be arranged between two thin serrated disks, D, to form a cutter of the desired thickness, this being equivalent to making a single cutter of equal thickness to the blank and cutters as combined.

In the machine here shown the invention is embodied in a practical form for cutting up old corsets for the purpose of separating the steels, eyelets, and whalebones from the cloth fiber, the side cylinders at D' being adapted for severing the busk-steels and eyelet-strips, and the broad cylinders for cutting the body portions transversely across the whalebones. With slight modification in the size and feeding apparatus the machine may be adapted for cutting various other materials which it is desired to sever into narrow strips or short pieces.

In the operation of the machine the material to be cut is fed between the cylinders from the apron or table, and the revolving cutters sever it into uniform strips corresponding in width to the width of the cutting-disks. The teeth d of the disks are readily forced through the material, and the depressions between the teeth receive the hard substances, thus preventing the material from escaping or sliding in front of the contact-edges of the cutters, so that the machine operates with comparative ease and effect, while the cutters, by reason of their form and arrangement, do not require to be sharpened, even though cutting hard substances, and, if broken or injured, can be readily renewed.

The cutters of case-hardened wrought-iron can be cheaply made, and are very durable, and the machine can be maintained in working condition at slight expense. It is rapid and efficient in its operation, and is adapted to severe usage without liability of derangement.

We are aware that a rag-dusting machine having two series of independently-acting saws has been heretofore described in Patent No. 927, dated September 19, 1838; but we do not claim an arrangement of mechanism as therein set forth.

What we claim as our invention, and desire to secure by Letters Patent, is—

1. In a machine for cutting rags and other materials, the combination of an upper and lower series of rotating disks, D, having teeth or serrations d about their peripheries, said disks D being arranged or mounted on adjacent rotating shafts C in alternating order for interacting and shearing against each other, substantially in the manner described.

2. The combination, with the rotating shafts C C, of the disk-cutters D, having toothed or serrated peripheral edges d, mounted in alternating order on the respective shafts, and adjustably retained between the collars c and nuts e, whereby the shearing-angles of the several disks or cutters can be set together with greater or less force, as and for the purpose set forth.

3. The combination, with the series of rotating toothed cutters and their supporting-shafts, of a series of clearers or bars, F, located intermediately between the respective cutters for forcing the severed material from the teeth thereof, substantially as hereinbefore set forth.

4. The clearers F, formed as shown, with loops $f$ and $l$, in combination with the shafts C C, rotating cutters D, and stay-bars E, substantially as and for the purpose set forth.

5. A cutter or disk, D, for rag-cutting machines, formed from or punched from ordinary sheet wrought-iron, with an irregular central eye notched or serrated about its periphery, as at $d$, and case-hardened, as set forth.

6. The combination, as hereinbefore described, of the cutter-cylinders composed of the interacting toothed cutters or disks D, mounted on rotating shafts C C, in the manner described, the clearer bars or fingers F, arranged between said cutters, the traveling apron or table G, the driving-shaft B, with pulleys B', and the gears C' $b$, for the purposes set forth.

Witness our hands this 23d day of June, A. D. 1882.

LEMUEL COBURN.
JEHIEL C. COBURN.

Witnesses:
 CHAS. H. BURLEIGH,
 AUSTIN U. MATHEWS.